Nov. 18, 1941.   N. B. STRACHOVSKY   2,262,975
UNIVERSAL JOINT
Filed Jan. 3, 1939
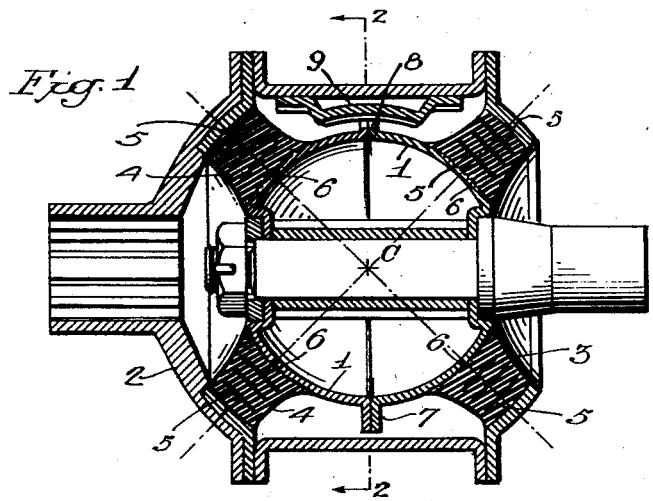
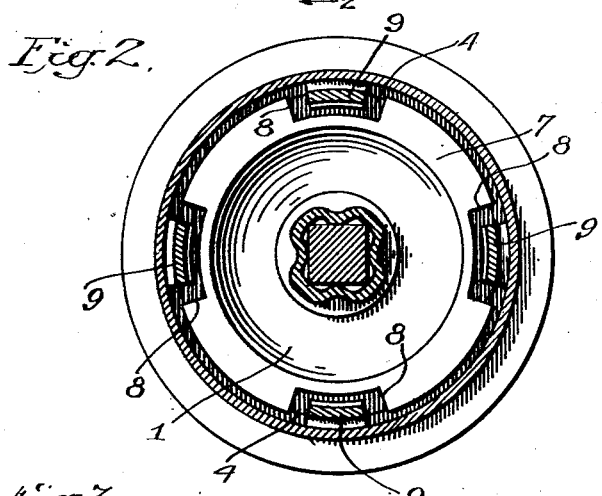
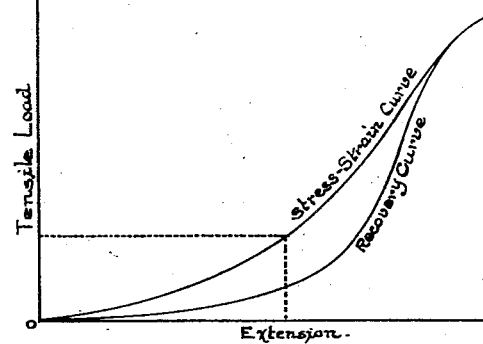
Inventor:
Nikita B. Strachovsky
by his Attorneys
Hawson & Howson Patented Nov. 18, 1941

2,262,975

UNITED STATES PATENT OFFICE 2,262,975

UNIVERSAL JOINT

Nikita B. Strachovsky, Paris, France, assignor to Thermoid Company, Trenton, N. J., a corporation of Delaware Application January 3, 1939, Serial No. 249,085

6 Claims. (Cl. 64—11)

A principal object of this invention is to provide a universal joint of generally improved characteristics wherein the driving and driven members of the joint are flexibly connected by resilient rubber or the like.

The invention resides in the novel principles and details of construction illustrated in the attached drawing, wherein:

Figure 1 is a longitudinal sectional view of a joint made in accordance with the invention;

Fig. 2 is a transverse sectional view on the line 2—2, Fig. 1, and

Fig. 3 is a diagram illustrating certain physical characteristics of rubber, as hereinafter more specifically set forth.

Rubber, when properly used, has unique vibration absorbing properties coupled with more than sufficient mechanical strength to serve as an elastic power transmission medium. I have found that the conditions under which both the power transmission and vibration absorption properties of rubber can be made use of with maximum efficiency are when the rubber is made to work in shear and extension at the same time. These conditions are motivated by the following considerations:

(1) In order to absorb vibration, it is necessary to oppose to the vigratory movements or impulses as much non-reactive inertia as possible. Rubber can be deformed to the highest degree with least resistance when only a tangential shear load is applied to it. It follows, therefore, that for vibration absorption purposes, rubber is most efficient when made to work in shear.

(2) Rubber is non-compressible, but only elastically deformable. When it is considered under what kind of stress rubber exhibits most elasticity, it is found that it does so when stretched. It, therefore, follows that for purposes of elastic power transmission rubber is most efficient when made to work in extension.

In order to combine in the rubber element to best advantage the two functions required, i. e. absorbing vibration at the same time as elastically transmitting power, consideration must be had to the physical characteristics of rubber as represented by the typical stress-strain and recovery diagram shown in Fig. 3. From a study of this diagram, it is found that the greatest loss of energy (difference between stress applied to obtain extension and strain set up in the rubber tending to return to rest) occurs in the rubber in the initial parts of the curves within the area bounded by the dotted line upon the diagram. It will also be noticed that maximum elongation for a given stress lies also within the same area. It, therefore, follows that in a device of the character contemplated by the invention a rubber element in order to absorb vibration and elastically transmit power to best advantage should be constituted and arranged so that the total power to be transmitted by it should load the rubber under a tangential stress which, when applied to a unit volume, would produce no greater elongation than that limited within the area bounded by the dotted line upon the diagram.

Outside of power transmission and vibration absorption, a successful rubber universal joint should possess four other definite mechanical characteristics:

(a) It should present the least resistance possible to the transmission of torque at an angle or to any variations of that angle.

(b) It should be centered as positively as possible.

(c) It should be capable of taking up elastically a certain amount of axial thrust.

(d) It should present a satisfactory coefficient of security.

In order to satisfy these four additional mechanical conditions a successful rubber universal joint must be so constructed that under angular attack or torque transmission, the required movements in the joint shall occur in shear and across the thinnest section of the rubber.

In order to remain positively centered, the distribution of the elastic rubber elements in the joint should be strictly symmetrical, and the rubber elements disposed between the driving and driven members should be so constructed as to oppose maximum resistance against all forces tending to displace the centers of rotation of the above members one in respect of the other.

Capacity for taking up elastically some definite value of axial thrust must be insured by the actual positioning of the elastic elements within the joint, without, however, impairing thereby any of the preceding requirements.

In order to provide the maximum coefficient of safety the elastic rubber must be bonded to the driving and driven members of the joint by some secure method of rubber to metal adhesion, such, for example, as obtained through electrolytic brass-plating. Also the bonding surfaces between the rubber and the driving and the driven members respectively should be rendered such as to allow similar and equal load distribution per unit bonding area upon both members.

The rubber universal joint forming the subject of the present invention satisfies, through its general conception and particular construction, all of the above conditions.

With reference to the drawing, the joint in preferred form consists essentially of two substantially spherical members 1 and 2, one being the male and the other being the female, each of which may be composed of two or more parts, as shown, for ease of manufacture. Between and securely bonded to the male and female members are placed the elastic rubber elements 3 and 4. From the section and shape of these elements it will be seen that in any relative angular displacement of the members 1 and 2 about the functional center of the joint, indicated by the reference letter C, the elements 3 and 4 are loaded only tangentially or circumferentially and in shear. By reason of the substantial parallelism of the surfaces of the members 1 and 2 in the areas embracing the rubber elements, every movement of the one member with respect to the other will pull the rubber and will cause it to work under extension, the work for all torsional stresses coming within the circumferential mass of rubber and for all angular movements across its thinnest section.

The rubber elements elastically binding the male and female joint members together, are placed between, and are bonded to them, without any or material initial stress deforming or acting upon the rubber in any way, so that when the joint is at rest, the rubber is substantially at rest also. Therefore, every effort transmitted to and by the rubber during the working of the joint will set up stresses within the initial part of the previously described typical stress-strain and recovery diagram, thus insuring maximum vibration absorption or damping within the joint.

In order to afford lesser or greater circumferential elasticity of the joint, the rubber elements 3 and 4 can be made either as continuous rings, as shown, or each element may consist of a plurality of separate sections in uniformly spaced annular series, like spokes.

In order to insure positive centering, the elastic rubber elements are symmetrically disposed in corresponding pairs, respectively at opposite sides of the transverse sectional plane of the joint, and in effect follow the lines of two hollow truncated cones having a common imaginary apex at the center C, said cones being defined by a common generatrix rotating through the apex point, as indicated by the broken lines in Fig. 1. Regardless of the number of rubber elements that may be used, therefore, the center or apex C is common to all.

The centering may be further enhanced by increasing the radial stiffness of the elastic rubber elements. This may be achieved in the following manner:

When a compression load acts upon rubber, it deforms by contracting the rubber in the direction of application of the load and by bulging out in all free directions perpendicular to said direction. If this bulging be restricted to any extent, the contraction of the rubber under the compression load will decrease in proportion to that restriction. Such a restriction can be effected by sandwiching into the rubber a number of nonelastic inserts, say of fabric or metal, in planes transverse to the direction in which the load is applied. It will be obvious that the placing of such inserts within a rubber will practically in no way interfere with its elasticity under the tangential shear load because the inserts would follow the rubber in all side movements. Thus for more positive centering the radial resistance of the elastic elements in the joint may be augmented by placing within the rubber, and parallel to the surfaces of the male and female members, a plurality of metal or fabric inserts 5. This increase of radial resistance may be controlled by the number and spacing of the inserts.

The elastic take-up of axial thrust may be varied by the positioning of the elastic rubber elements within the joint. When these elements are placed in close proximity to the transverse sectional plane of the joint, their thrust take-up capacity decreases. When, on the other hand, the elastic elements are moved towards the axial area, the resistance of the joint to axial thrust is increased. In any case, care must be taken to conserve perfect symmetry in the placing of the elastic elements within the joint, in order to retain maximum positiveness in centering.

In order to insure maximum safety in the functioning of the joint under load, the total areas of the bonded surfaces between the elastic elements and the respective male and female members are proportioned so that they shall both work under substantially the same load per unit area. As the torque load applying to the male and female members is greater for the former than for the latter, the bonding surface increase on the male member is obtained first by flaring out the sectional shape of the elastic rubber elements towards their base reposing on the male member, and second by artificially increasing the outside surface area of the male member either by scalloping the metal or by machining circumferential or meridianal grooves of appropriate depth, or both, as indicated at 6 in Fig. 1.

In order to preclude rupture of the rubber elements, or separation of the rubber elements from the male and female members of the joint by imposition upon the joint of excessive abnormal torsional strains, I provide between the male and female members positive stop means, which limits the extent to which the male member may rotate about its axis with respect to the female member. This stop means consists in the present instance of a radial flange 7 on the male member having a plurality of recesses 8, into each of which projects a strap 9 secured to the inside of the female member. As shown in Fig. 2, the straps 9 are of lesser width than the corresponding dimension of the recesses 8, so that a certain degree of relative movement between the parts is permitted. The straps, as shown in Fig. 1, are so formed as in no way to interfere with the angular displacement of the male and female members of the joint which occurs in the normal working of the latter.

It will be understood that the term "rubber" as used in the foregoing description and in the appended claims comprehends all other elastic materials, either synthetic or of natural origin, having physical properties similar to those of rubber and, therefore, capable of use for the purposes and functions of the invention.

I claim:

1. A universal joint comprising male and female members relatively movable with respect to a common center, and rubber elements operatively connecting said members and normally retaining said members in position with respect to said common center, said elements extending substantially radially with respect to said center and being arranged symmetrically with respect to and at opposite sides of a plane extending transversely of and at right angles to the normal rotational axis of said joint and through said center, and the inner ends of said elements being disposed in a spherical surface concentric with said common center whereby all relative angular movements of said members about said center are effected without material compression of said elements.

2. A universal joint comprising male and female members relatively movable with respect to a common center, and rubber elements operatively connecting said members and normally retaining said members in position with respect to said common center, said elements being arranged symmetrically with respect to and at opposite sides of a plane extending transversely of and at right angles to the normal rotational axis of said joint and through said center, and each in the form of an annulus following the lines of a hollow truncated cone the imaginary apex of which lies in said common center.

3. A universal joint comprising male and female members relatively movable with respect to a common center, and rubber elements operatively connecting said members and normally retaining said members in position with respect to said common center, said elements extending substantially radially with respect to said center and being arranged symmetrically with respect to the normal rotational axis of said joint and with respect also to and at opposite sides of a plane extending transversely of and at right angles to said rotational axis and through said center, and the inner ends of said elements being disposed in a spherical surface concentric with said common center whereby all relative angular movements of said members about said center are effected without material compression of said elements.

4. A universal joint comprising male and female members relatively movable with respect to a common center, and rubber elements operatively connecting said members and normally retaining said members in position with respect to said common center, said elements being arranged symmetrically with respect to and at opposite sides of a plane extending transversely of and at right angles to the normal rotational axis of said joint and through said center, and each in the form of an annulus following the lines of a hollow truncated cone the major axis of which coincides with the normal rotational axis of the joint and the imaginary apex of which lies in said common center.

5. A universal joint comprising male and female members relatively movable with respect to a common center, and rubber elements operatively connecting said members and normally retaining said members in position with respect to said common center, said elements extending substantially radially with respect to said center and being substantially free from stress when the joint is in the normal condition of rest, and said elements being arranged symmetrically with respect to the normal rotational axis of said joint and with respect also to and at opposite sides of a plane extending transversely of and at right angles to said rotational axis and through said center.

6. A universal joint comprising male and female members relatively movable with respect to a common center, and rubber elements operatively connecting said members and normally retaining said members in position with respect to said common center, said elements being arranged symmetrically with respect to and at opposite sides of a plane extending transversely of and at right angles to the normal rotational axis of said joint and through said center, and each in the form of an annulus following the lines of a hollow truncated cone the major axis of which coincides with the normal rotational axis of the joint and the imaginary apex of which lies in said common center, and said elements being substantially free from stress when the joint is in the normal condition of rest.

NIKITA B. STRACHOVSKY.